United States Patent [19]
Novick et al.

[11] 4,412,414
[45] Nov. 1, 1983

[54] HEAVY FUEL COMBUSTOR

[75] Inventors: Allen S. Novick, Lafayette; Jerry G. Tomlinson, Indianapolis; Dennis L. Troth, Speedway, all of Ind.

[73] Assignee: General Motors Corporation, Detroit, Mich.

[21] Appl. No.: 189,072

[22] Filed: Sep. 22, 1980

[51] Int. Cl.[3] .......... F02C 1/00

[52] U.S. Cl. .......... 60/39.23; 60/39.29; 60/737

[58] Field of Search .......... 60/737, 738, 39.23, 60/39.29, 39.82 P

[56] References Cited

U.S. PATENT DOCUMENTS

| | | | |
|---|---|---|---|
| 2,706,150 | 4/1955 | Lloyd | 60/39.12 |
| 2,916,367 | 12/1959 | Stokes | 60/39.12 |
| 2,922,279 | 1/1960 | Roberson et al. | 60/737 |
| 3,691,762 | 9/1972 | Ryberg et al. | 60/737 |
| 3,851,466 | 12/1974 | Verdouw | 60/737 |
| 3,925,002 | 12/1975 | Verdouw | 60/737 |
| 3,930,369 | 1/1976 | Verdouw | 60/737 |
| 4,012,904 | 3/1977 | Nogle | 60/737 |
| 4,078,377 | 3/1978 | Owens et al. | 60/737 |
| 4,301,656 | 11/1981 | Stettler | 60/39.82 P |

*Primary Examiner*—Carlton R. Croyle
*Assistant Examiner*—Jeffrey A. Simenauer
*Attorney, Agent, or Firm*—J. C. Evans

[57] ABSTRACT

A combustor for burning heavy residual fuel to drive a gas turbine engine has an elongated, imperforate vaporizing tube with an air blast nozzle at one end of the tube adjacent a cannister type preheater means arranged to swirl air blasted residual fuel in the tube to produce vaporization while preventing autoignition and wherein the vaporized fuel is processed through a primary crossed slot air mixer means for reducing the temperature of the air/fuel mixture passing from the vaporizing tube and to establish an equivalence ratio in the air/fuel mixture at a lean reaction zone combustion chamber for burning a lean air/fuel mixture from the primary air mixer means under controlled conditions and wherein a combustor torch igniter directs an igniting flame into the lean air/fuel mixture directed from the air mixer means so as to assure continuous combustion in the lean combustion zone so as to reduce hydrocarbon and carbon monoxide emissions from the combustion apparatus under varying conditions of gas turbine engine operation.

2 Claims, 4 Drawing Figures

HEAVY FUEL COMBUSTOR

This invention relates to gas turbine engine combustors and more particularly to such combustors having prevaporization sections.

Premix, prevaporization sections have been included in combustors for gas turbine engines to condition the fuel ahead of a combustion reaction zone therein so as to improve combustor air/fuel homogeneity and to avoid fuel droplet burning which is one source of oxides of nitrogen. In such cases, it is desirable to prevent entrance of a flame front into the prevaporization zone from a downstream combustion zone of the apparatus. Furthermore, it is desirable to operate the combustion zone at a lean air/fuel ratio to minimize formation of oxides of nitrogen. Combustor residence time to complete combustion of carbon monoxide and hydrocarbons is balanced by sufficient control of the equivalence ratio; the ratio of the actual fuel/air ratio within the combustion apparatus to the fuel/air ratio to produce stoichiometric reactions of the air and fuel within the combustor and to reduce emissions from the engine.

U.S. Pat. No. 3,851,466, issued Dec. 3, 1972, to Verdouw, for COMBUSTION APPARATUS with a common assignee to that of the present application has an elongated, imperforate prevaporization tube in association with a low emissions burner. While satisfactory for its intended purpose, it does not take into account the use of heavy residual fuels of the type presently being considered for use in stationary gas turbine engine installations.

Accordingly, an object of the present invention is to provide low emission combustion apparatus for use in gas turbine engines of the type including prevaporization sections therein that are arranged to increase the homogeniety of an air/fuel mixture by the provision of an elongated, imperforate, prevaporization tube having a variable source of air and fuel supplied to the inlet end thereof to vary the amount of fuel flow into the vaporizing tube in accordance with engine operating conditions and including a side mounted, cannister type preheater combustor for directing a blast of heated swirling convective heating air into the air/fuel mixture immediately upon its exit from the air/fuel nozzle to produce a high temperature for vaporizing the heavy fuel component from the nozzle throughout the length of the vaporizing tube and wherein the vaporizing tube has a length that maximizes the fuel vaporization while preventing autoignition of the fuel components as swirling air/fuel mixture passes therethrough; and wherein a crossed slot primary air mixer means is located to form an abrupt expansion chamber from the tube and is operative to direct air jets into flow from the vaporizing section to rapidly reduce the temperature thereof and to reduce the equivalence ratio of the fuel/air mixture flowing into a lean reaction zone defined by a combustion liner and wherein variable geometry control means are associated with both the inlet air/fuel nozzle and the mixer means to maintain the equivalence ratio in the range of 0.4 to 0.6 under all conditions of operation to prevent excessive emissions of oxides of nitrogen during the operation of the gas turbine engine.

Yet another object of the present invention is to provide a variably controlled combustion apparatus for burning heavy residual fuels and the like in a gas turbine engine installation including means defining an inlet air plenum and including an elongated, imperforate vaporizing tube having an inlet end thereon and an outlet end and a length selected to produce maximum vaporization of heavy residual fuel directed therethrough without autoignition of the fuel and wherein a variable flow geometry fuel nozzle is located on one end of the vaporizing tube for spraying a mixture of residual fuel and air as a swirl into one end of the tube and wherein a cannister type preheater is located with a longitudinal axis offset from the center line of the vaporizing tube to produce a high velocity convective flow of heated air as a swirl into the vaporizing tube immediately downstream of the point that fuel flows from the combustor fuel nozzle and the preheater including means for generating an energy input to the vaporizing tube in accordance with the quantity of fuel supplied to the variable flow combustor fuel nozzle in accordance with engine operation to increase the temperature of the vaporizing tube to produce fuel vaporization without producing autoignition of the residual fuel and wherein the combustor includes variable geometry mixer means for receiving flow from the vaporizing section to rapidly reduce its temperature and to produce a lean fuel/air ratio from the air mixer means and further including an outlet flame tube including a reaction zone having a wall connected torch igniter directing an ignition flame across the cooled lean air/fuel mixture from the primary air mixer to burn hydrocarbons and carbon monoxide in the lean reaction zone without increasing the temperature of the lean reaction zone to undesirably increase emissions of oxides of nitrogen from the combustion apparatus.

Still another object of the present invention is to provide a combustion apparatus for burning residual fuel and the like including an elongated imperforate vaporizing tube having an inlet connected to a combustor fuel nozzle supply for directing a highly atomized variable source of air/fuel mixture to the combustion apparatus and including a preheater that will direct a flow of heated convective gas into the vaporizing tube immediately downstream of fuel flow from the nozzle means with the energy input from the preheater varying in accordance with the amount of air/fuel mixture supplied to the inlet and sufficient to vaporize residual fuel flow from the nozzle without autoignition of the fuel as it is being swirled and heated and vaporized in the elongated imperforate vaporizing tube and further including air mixer means to receive the heated vaporized air/fuel mixture from the vaporizing tube to rapidly reduce the temperature of the mixture from the vaporizing tube and to do so by cross-inclined inlet air flow slots that produce air/fuel mixing without reducing the momentum of radially inflowing air jets into the air stream and thereafter including means for receiving the cooled, lean air/fuel mixture from the primary air zone including means for burning the resultant homogenous mixture to control emissions of hydrocarbons and carbon monoxide as well as to control oxides of nitrogen.

Further objects and advantages of the present invention will be apparent from the following description, reference being had to the accompanying drawings wherein a preferred embodiment of the present invention is clearly shown.

Figures 1, 2, 3, 4:
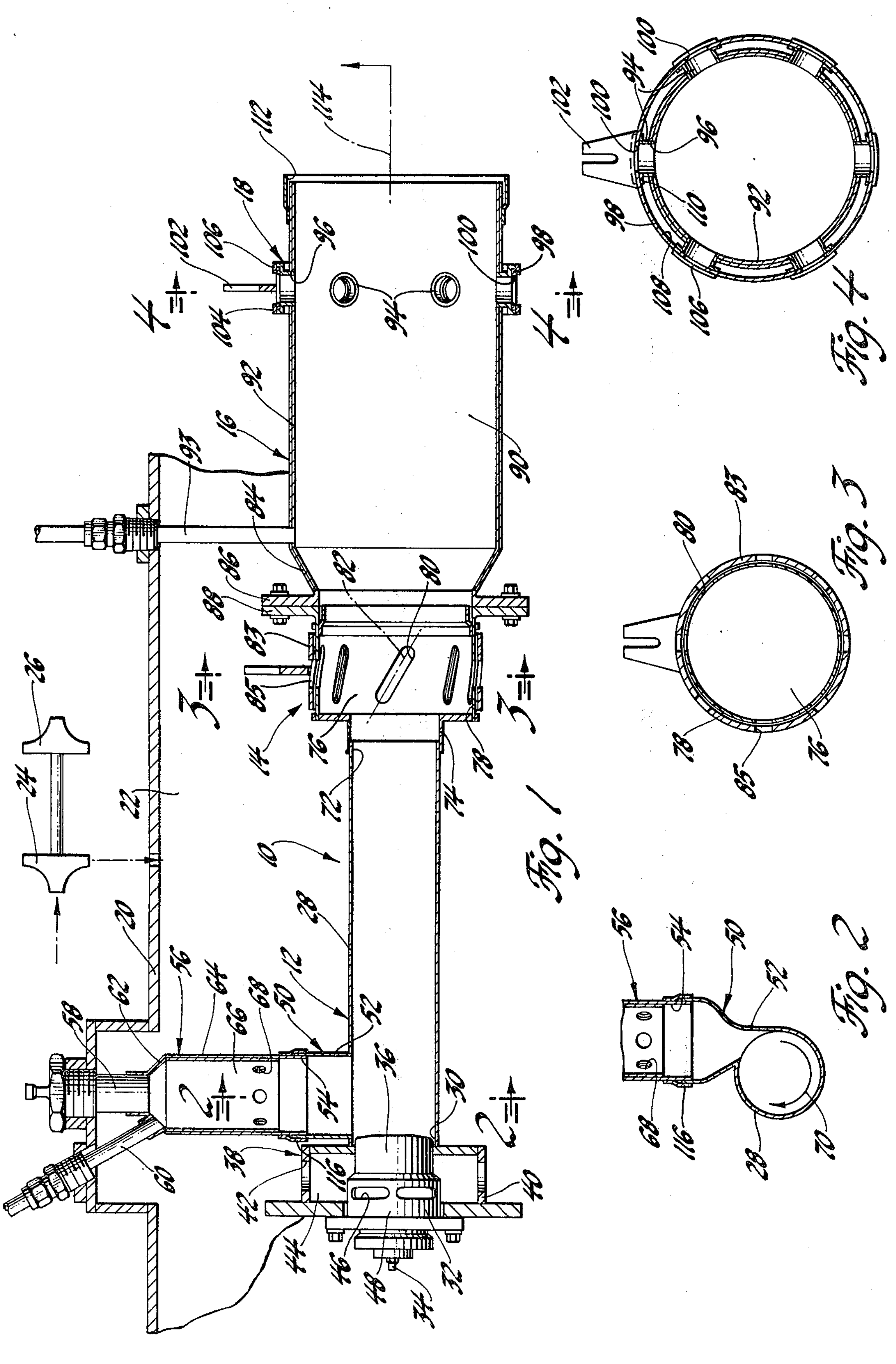
FIG. 1 is a longitudinal cross sectional view of combustion apparatus constructed in accordance with the present invention.
FIG. 2 is a cross sectional view taken along the line 2—2 of FIG. 1 looking in the direction of the arrows.
FIG. 3 is a vertical sectional view taken along the line 3—3 of FIG. 1 looking in the direction of the arrows.
FIG. 4 is a sectional view taken along the line 4—4 of FIG. 1 looking in the direction of the arrows.

Referring now to the drawings, a residual or heavy fuel combustion apparatus 10 is illustrated including a fuel vaporizing section 12; a primary air mixer section 14; a combustion chamber section 16 and a dilution section 18, all aligned in series flow relationship with one another.

The combustion apparatus 10, more particularly, is enclosed within an engine housing 20 that defines an inlet air plenum 22 that is connected to the output of a gasifier compressor 24 driven by a turbine 26 that receives motive fluid from the combustion apparatus 10.

The vaporizing section 12, in accordance with the present invention, has an elongated, imperforate fuel vaporizing tube 28 that has a length and a diameter to maintain a desired residence time for fuel components directed thereto that will maximize vaporization of those fuel components without autoignition thereof during the different operating cycles of the gas turbine engine.

The tube 28 more particularly includes an inlet end 30 in which is located a combustor fuel nozzle 32. The combustor fuel nozzle 32 more particularly includes means therein to variably control the quantity of fuel from a primary fuel line 34 that is adapted to be connected to a source of residual fuel or the like of the type having low vaporization characteristics. The combustor fuel nozzle 32 in addition to having a variable fuel outlet 36 additionally includes a radially inwardly directed air supply housing 38 having an outer annular ring 40 which ports 42 therein that supply an inlet air plenum 44 that supplies air to ports 46 in an outer wall 48 of nozzle 32.

Variable quantities of air and fuel are directed from the outlet nozzle 36 and pass across a convective swirler 50 formed by transition member 52 connected to the outlet 54 of a cannister preheater 56 that has its longitudinal center line located offset to the longitudinal axis of the tube 28 as best shown in FIG. 2. The transition member 52 is connected tangentially to the tube 28 to produce a swirl function to be discussed. In the illustrated arrangement preheater 56 includes an independent fuel nozzle 58 and a fuel igniter 60 located in a dome 62 thereof that closes the upper end of a liner wall 64 to form a preheater reaction zone 66 for burning the air and fuel from the fuel nozzle 58. A plurality of mixing holes 68 are provided to condition the gas flow from the preheater 56 to prevent excessive oxides of nitrogen at this point in the combustion apparatus 10. The preheater 56 constitutes a controllable source of heat energy directed into the vaporizer section 12 for assuring complete vaporization of difficult to vaporize residual fuel that is directed from the combustor fuel nozzle 32. The apparatus is especially suited for the aforementioned residual fuel since the hot gases passing through the transition section 52 will be directed through a swirl flow path 70 to produce an intense swirling effect on the nozzle atomized droplets of residual fuel to increase homogenization and vaporization of the fuel. Furthermore, the swirling gas at flow path 70 is extended axially along the length of the tube 28 so that the swirling air/fuel mixture passes through the tube 28 to heat it. The tube 28 has length and diameter and a residence time to continually vaporize the fuel to optimize the amount of vaporization of the residual fuel droplets. The amount of vaporization is limited by the heating effect that is produced within the tube 28. It, in turn, is maintained below a level where the residual fuels will autoignite prior to passage from the tube 28. As a result, the vaporizing section 12 constitutes a vaporizing section only without combustion and as a result will not produce any excessive emissions of oxides of nitrogen from the apparatus.

Nevertheless, the vaporizing process itself can increase the temperature of the air/fuel mixture issuing from the outlet 72 of the tube 28 to a level that might affect subsequent combustion. Preferably the mixture from the tube 28 will be reduced in temperature to prevent thermal production of oxides of nitrogen in subsequent combustion. In accordance with the present invention, to accomplish this objective, an improved high intensity primary air mixer section 14 is included having an inlet 74 joined to the outlet of the tube 28 and defining an abrupt increase in volume therefrom to define a mixing chamber 76 that is surrounded by an outer wall 78 having a plurality of air mixing slots 80 formed therein, each having a major axis 82 thereof inclined with respect to the longitudinal axis of main gas flow issuing from the smaller diameter outlet 72 into the larger diameter mixing chamber 76. A control ring 83 has holes 85 adjustably aligned with slots 82.

The slots 80 are arranged in a crossed fashion to prevent penetration of mixing air through the mixing chamber 76 against an opposite inner surface portion of the outer wall 78 and as a result the momentum of the mixing air is retained so as to produce a high level mixing of inlet reaction air with the products from the vaporizing tube 28 prior to entrance into the combustion chamber section 16. More particularly, in the illustrated arrangement the combustion chamber section 16 includes an inlet formed as a dome wall 84 divergent from the mixer section 14. Wall 84 has a flange 86 at the inlet end thereof secured to an aft flange 88 on the outer wall 78 as best shown in FIG. 1. The dome 84 will direct reaction air quenched and vaporized products from the elongated tube 28 into a combustion reaction zone 90 formed by a cylindrical liner wall 92 formed of porous laminated material of the type more specifically set forth in U.S. Pat. No. 3,584,972, issued June 15, 1971, to Bratkovich et al. The mixed vaporized fuel and air are maintained at a reduced equivalence ratio; for example, in the order of 0.4 to 0.6, so as to reduce emissions of oxides of nitrogen during the combustion process within the reaction chamber 90. Equivalence ratio is the ratio of the actual weight ratio of fuel-to-air divided by the ratio of the weight of fuel-to-air to produce stoichiometric conditions. In order to maintain the flame front within the reaction chamber 90 a wall mounted combustor torch igniter 93 is located at the transition point between the dome wall 84 and the downstream cylindrical liner wall 92 of the combustor 16. A plurality of radially outwardly directed dilution air flow thimbles 94 are supported in equidistantly circumferentially spaced holes 96 through the wall 92. The thimbles 94 are covered by a control ring 98 having a plurality of air flow control ports 100 therein that are selectively positioned into alignment with the thimbles 94 by control apparatus (not shown) connected to an operator arm 102 fastened at one end to the ring 98 as best seen in FIG. 4. Each thimble 94 has a pair of opposed, side located channels 104, 106 which captures the side edges of ring 98 to guidingly locate the inboard sealing surface 108 of ring 98 against an outer thimble flange 110. Engagement between surface 108 and thimble flange 110 will block inlet air flow when ports 100 are out of alignment with the thimbles 94. Depending upon the angular relationship between the control ring 98 and the thimbles 94, a controlled amount of dilution air can be passed into the exhaust gas from the combustion reaction chamber 90 to maintain the temperature thereof below those temperatures at which excessive oxides of nitrogen are produced.

The outlet 112 from the combustion chamber section 16 is connected through a suitable transition path 114 to direct the motive fluid through the turbine 26 for driving the gasifier 24 for supplying inlet air into the plenum 22.

In operation, the heavy residual fuel supply 34 is blasted from the nozzle 36 into intersecting relationship with the swirl flow path 70 from the preheater 56. The amount of heat input from the preheater 56 will vaporize fuel droplets from the air blast nozzle 32. The cooler running liner wall 64 of the preheater 56 will adjust with respect to the cooler operating tube 28 through a slip joint 116 defined between the liner wall 64 and the transition section 52.

The length and diameter of the tube 28 and the swirling air/fuel convectively heated mixture passed therethrough are selected so that fuel will be vaporized without causing autoignition thereof. The vaporized air/fuel mixture is then quickly quenched by the high momentum air jets passing through the slots 80 of the primary air mixer 14 prior to passage into the reaction zone 90. The amount of primary mixing air is selected to reduce the equivalence ratio within zone 90 and to control it to a level to prevent excessive emissions from the combustor. The provision of torch igniters 60, 93 at the indicated locations in FIG. 1 assures ignition sources for flame fronts in both the preheater 56 and the combustion chamber section 16. Further, the use of porous laminate liner material enables reduced amounts of cooling air to cool the liner at combustor chamber section 16.

While the embodiments of the present invention, as herein disclosed, constitute a preferred form, it is to be understood that other forms might be adopted.

The embodiments of the invention in which an exclusive property or privilege is claimed are defined as follows:

1. In a high vapor temperature liquid fuel combustor, the combination comprising, a vaporizing tube of predetermined length and cross section having an inlet and an outlet, a fuel nozzle at said inlet connected to a source of said fuel and to a source of compressed air and operative to separate said fuel by air blast into a plurality of droplets and to direct a longitudinal stream of said droplets into said tube, a preheat combustor means operative to generate a preheat stream of heated products of combustion, means operative to direct said preheat stream into said tube generally at said inlet for interception of said droplet stream and mixture therewith whereby said mixture traverses said tube toward said outlet in a longitudinally moving swirl having a residence time in said tube proportional to said length and said cross section thereof and sufficient in duration for the heat from said preheat stream to vaporize said droplets without autoignition of said vapor, a primary air mixer connected to said tube outlet and to said compressed air source operative to combine said vaporized fuel and compressed air into a combustible mixture, first variable geometry means for regulating air flow into said primary air mixer thereby to control the equivalence ratio of said combustible mixture to reduce production of nitrous oxides, means defining a lean reaction zone for receiving said combustible mixture from said primary air mixer, means for igniting said mixture in said lean reaction zone to generate products of combustion, and second variable geometry means in a downstream portion of said lean reaction zone for regulating air flow from said compressed air source into said downstream portion to quench said products of combustion.

2. In a high vapor temperature liquid fuel combustor disposed in a compressed air plenum, the combination comprising, a cylindrical vaporizing tube of predetermined length and diameter having an inlet and an outlet, a fuel nozzle at said inlet connected to a source of said fuel and to said plenum and operative to separate said fuel by air blast into a plurality of droplets and to direct a longitudinal stream of said droplets into said tube, a preheat combustor means operative to generate a preheat stream of products of combustion, a transition conduit disposed between said preheat combustor and said tube generally at said inlet operative to direct said preheat stream into said tube generally tangentially with respect to said diameter thereof whereby said preheat stream intercepts and mixes with said longitudinal droplet stream and imparts to said mixture a longitudinally moving swirl toward said outlet having a residence time in said tube proportional to said length and said diameter thereof and sufficient in duration for the heat from said preheat stream to vaporize said droplets without autoignition of said vapor, a cylindrical housing having a diameter exceeding said tube diameter and defining a primary mixing chamber connected to said tube outlet for receiving said swirling vapor, means defining a plurality of primary air slots in said housing between said mixing chamber and said plenum whereby jets of primary air are directed generally radially into said chamber for combination with said vapor into a lean combustible mixture, a first rotatable shroud disposed on said housing for opening and closing said air slots whereby the equivalence ratio of said combustible mixture is controlled to reduce nitrous oxides, means defining a lean reaction zone for receiving said combustible mixture from said mixing chamber, means for igniting said combustible mixture in said lean reaction zone to generate products of combustion, means defining a plurality of dilution air holes in a downstream portion of said lean reaction zone for admitting dilution air from said plenum to quench said products of combustion, and a second rotatable shroud around dilution air holes operative to open and close the latter for regulating the flow of dilution air.

* * * * *